United States Patent [19]

Thomas et al.

[11] Patent Number: 4,924,463
[45] Date of Patent: May 8, 1990

[54] DATA CODING METHOD FOR USE IN DIGITAL COMMUNICATION SYSTEMS

[75] Inventors: Robert E. Thomas, Hudson; Jeffrey L. Cooper, Worcester; Robert J. Simcoe, Westborough, all of Mass.

[73] Assignee: Digital Equipment Corporation, Maynard, Mass.

[21] Appl. No.: 383,439

[22] Filed: Jul. 24, 1989

Related U.S. Application Data

[63] Continuation-in-part of Ser. No. 318,463, Mar. 2, 1989, abandoned, which is a continuation of Ser. No. 176,314, Mar. 3, 1988, abandoned.

[51] Int. Cl.$^5$ .............................................. H04J 3/06
[52] U.S. Cl. .................................. 370/105.4; 375/114
[58] Field of Search ............... 370/100.1, 105.1, 105.4, 370/110.1; 375/25, 37, 26, 30, 31, 34, 110, 113, 114; 371/2, 65, 56, 37

[56] References Cited

U.S. PATENT DOCUMENTS

| | | | |
|---|---|---|---|
| 3,985,967 | 10/1976 | Colton et al. | 370/105.1 |
| 4,161,719 | 7/1979 | Parikh et al. | 375/114 |
| 4,530,088 | 7/1985 | Hamstra et al. | 370/110.1 |
| 4,606,056 | 8/1986 | Perloff | 375/110 |

Primary Examiner—Joseph A. Orsino
Assistant Examiner—Frank M. Scutch, III
Attorney, Agent, or Firm—Jones, Tullar & Cooper

[57] ABSTRACT

A data coding method for digital communication systems is disclosed. In two embodiments, every four bits of data in a first data channel are mapped to a five bit code symbol. The five bit code symbols are chosen to have a duty cycle of 40 to 60 percent. In the first embodiment, a second channel of data is optionally interleaved with the encoded first channel data by placing single bits from the second channel every sixth bit in the data stream between each five bit code symbol. A plurality of synchronizing words are each formed from other pairs of five bit code symbols, and, in the two channel embodiment, the optional two bits of data from the second channel. The synchronizing words also have a duty cycle of 40 to 60 percent, and further have the characteristic that their bit patterns can only occur where they are placed in a stream of encoded data. This enables them to be easily recognized in a data stream for both synchronization of a communication element with the encoded data stream, and conveyance of control information between elements in the system. The second channel can also be utilized for conveyance of control information, as a separate data channel, or in a third embodiment, to provide an exact 50 percent duty cycle for a "balanced" code in which every four bits of data are mapped to a six bit code symbol. The maximum run length of this code is limited to five if the second channel is used, and four if it is not used.

20 Claims, 14 Drawing Sheets

IN BAND CODE SYMBOLS FOR
4B/5B AND 4B/1/6B CODES

```
 1. 00101
 2. 00110
 3. 01001
 4. 01010
 5. 01011
 6. 01100
 7. 01101
 8. 01110
 9. 10001
10. 10010
11. 10011
12. 10100
13. 10101
14. 10110
15. 11001
16. 11010
```

SAMPLE ENCODED DATA STREAM
FOR 4B/1/6B CODE

4B/1/6B Synchronizing Words

4B/1/6B Mutually Compatible
Synchronizing Words

CONTROL WORDS FOR 4B/1/6B CODE LEFT SYMBOL OUT-OF-BAND
RIGHT SYMBOL ANY SYMBOL

| | | |
|---|---|---|
| 1. X00100X01011 | 24. X01000X01011 | 40. X10111X00010 |
| 2. X00100X01101 | 25. X01000X01101 | 41. X10111X00011 |
| 3. X00100X01110 | 26. X01000X01110 | 42. X10111X00100 |
| 4. X00100X10011 | 27. X01000X10011 | 43. X10111X00101 |
| 5. X00100X10110 | 28. X01000X10101 | 44. X10111X00110 |
| 6. X00100X10110 | 29. X01000X10110 | 45. X10111X01001 |
| 7. X00100X11001 | 30. X01000X11001 | 46. X10111X01010 |
| 8. X00100X11010 | 31. X01000X11010 | 47. X10111X01100 |
| 9. X00100X11011 | 32. X01000X11011 | 48. X10111X10010 |
| 10. X00100X11101 | 33. X01000X11101 | 49. X10111X10100 |
| 11. X00111X00010 | 34. X01111X00100 | 50. X11011X00001 |
| 12. X00111X00011 | 35. X01111X00100 | 51. X11011X00010 |
| 13. X00111X00100 | 36. X01111X00110 | 52. X11011X00011 |
| 14. X00111X00101 | 37. X01111X01001 | 53. X11011X00100 |
| 15. X00111X00110 | 38. X01111X01010 | 54. X11011X00101 |
| 16. X00111X10010 | 39. X01111X01100 | 55. X11011X00110 |
| 17. X00111X10011 | | 56. X11011X01001 |
| 18. X00111X10100 | | 57. X11011X01010 |
| 19. X00111X10101 | | 58. X11011X01100 |
| 20. X00111X10110 | | 59. X11011X10001 |
| 21. X00111X11001 | | 60. X11011X10010 |
| 22. X00111X11010 | | 61. X11011X10100 |
| 23. X00111X11100 | | |

FIG. 4A

CONTROL WORDS FOR 4B/1/6B CODE RIGHT SYMBOL OUT-OF-BAND
LEFT SYMBOL ANY SYMBOL

| | | |
|---|---|---|
| 1. X01011X00001 | 31. X00111X00100 | 56. X00100X11101 |
| 2. X01101X00001 | 32. X01011X00100 | 57. X00101X11101 |
| 3. X10011X00001 | 33. X01101X00100 | 58. X00110X11101 |
| 4. X10101X00001 | 34. X01110X00100 | 59. X01000X11101 |
| 5. X11001X00001 | 35. X01111X00100 | 60. X01001X11101 |
| 6. X11011X00001 | 36. X10011X00100 | 61. X01010X11101 |
| | 37. X10101X00100 | 62. X01100X11101 |
| 7. X00111X00010 | 38. X10110X00100 | 63. X10001X11101 |
| 8. X01011X00010 | 39. X10111X00100 | 64. X10010X11101 |
| 9. X01101X00010 | 40. X11001X00100 | 65. X10100X11101 |
| 10. X01110X00010 | 41. X11010X00100 | |
| 11. X10011X00010 | 42. X11011X00100 | |
| 12. X10101X00010 | | |
| 13. X10110X00010 | 43. X00100X11011 | |
| 14. X10111X00010 | 44. X00101X11011 | |
| 15. X11001X00010 | 45. X00110X11011 | |
| 16. X11010X00010 | 46. X01000X11011 | |
| 17. X11011X00010 | 47. X01001X11011 | |
| | 48. X01010X11011 | |
| 18. X00110X00011 | 49. X01100X11011 | |
| 19. X00111X00011 | 50. X10001X11011 | |
| 20. X01010X00011 | 51. X10010X11011 | |
| 21. X01011X00011 | 52. X10100X11011 | |
| 22. X01100X00011 | | |
| 23. X01110X00011 | 53. X00111X11100 | |
| 24. X10010X00011 | 54. X01011X11100 | |
| 25. X10011X00011 | 55. X10011X11100 | |
| 26. X10100X00011 | | |
| 27. X10110X00011 | | |
| 28. X10111X00011 | | |
| 29. X11010X00011 | | |
| 30. X11011X00011 | | |

4B/5B Synchronizing Words

```
 1.  00110 11110
 2.  00111 00001
 3.  00111 01110
 4.  00111 10001
 5.  00111 10110
 6.  01000 01110
 7.  01000 1110
 8.  01101 11100
 9.  01110 00010
10.  01110 00011
11.  01110 11100
12.  01111 00001
13.  01111 00010
14.  01111 00011
15.  01111 01100
16.  10000 10011
17.  10000 11100
18.  10000 11101
19. ·10000 11110
20.  10001 00011
21.  10001 11101
22.  10001 11101
23.  10010 00011
24.  10111 00001
25.  10111 10001
26.  11000 01001
27.  11000 01110
28.  11000 10001
29.  11000 11110
30.  11001 00001
```

EXAMPLE SET #1 OF MUTUALLY COMPATIBLE SWs FOR 4B/5B Code

EXAMPLE SET #2 OF MUTUALLY
COMPATIBLE SWs FOR 4B/5B
CODE

IN – BAND SYMBOLS FOR
BALANCED 4B/6B Code

BALANCED 4B/6B SYNCHRONIZING WORDS 1. 001000 111101
2. 001000 111110
3. 001001 111100
4. 001010 111100
5. 001011 011100
6. 001100 011110
7. 001100 111100
8. 001101 011100
9. 001110 011100
10. 001111 000011
11. 001111 001100
12. 001111 010100
13. 001111 100001
14. 001111 100010
15. 001111 100100
16. 010000 111101
17. 010000 111110
18. 010001 111001
19. 010001 111010
20. 010001 111100
21. 010100 011110
22. 010111 000011
23. 010111 100001
24. 011000 011110
25. 011000 111100
26. 011011 100001
27. 011100 001011
28. 011100 001101
29. 011100 001110
30. 011110 000011
31. 011110 000101
32. 011110 000110
33. 011111 000001
34. 011111 000010
35. 011111 000100
36. 100000 111011
37. 100000 111101
38. 100000 111110
39. 100001 111001
40. 100001 111010
41. 100001 111100
42. 100011 110001
43. 100011 110010
44. 100011 110100
45. 100100 011110
46. 100111 000011
47. 100111 100001
48. 101000 011110
49. 101000 111100
50. 101011 100001
51. 101110 000011
52. 101110 000101
53. 101110 000110
54. 101111 000001
55. 101111 000010
56. 110000 011011
57. 110000 011101
58. 110000 011110
59. 110000 101011
60. 110000 110011
61. 110000 111100
62. 110001 100011
63. 110010 100011
64. 110011 000011
65. 110011 100001
66. 110100 100011
67. 110101 000011
68. 110110 000011
69. 110111 000001
70. 110111 000010

FIG. 9

EXAMPLE SET OF MUTUALLY COMPATIBLE
SWs FOR 4B/6B CODE

EXAMPLE SET OF OUT-OF-BAND CONTROL
WORDS FOR 4B/5B CODE 1. 00111 00010
2. 00111 00011
3. 00111 00100
4. 01000 11011
5. 01000 11100
6. 01000 11101
7. 01111 00011
8. 01111 00100
9. 10000 11011
10. 10000 11100
11. 10111 00010
12. 10111 00011
13. 10111 00100
14. 11000 11011
15. 11000 11100
16. 11000 11101

FIG. IIA

FIG. 11B EXAMPLE SET OF OUT-OF-BAND BALANCED CONTROL WORDS FOR 4B/6B CODE

| # | Word | # | Word |
|---|---|---|---|
| 1. | 001000 111011 | 51. | 010010 101011 |
| 2. | 001000 111101 | 52. | 010010 101101 |
| 3. | 001001 011011 | 53. | 010010 101110 |
| 4. | 001001 011101 | 54. | 010010 110011 |
| 5. | 001001 011110 | 55. | 010010 110101 |
| 6. | 001001 101011 | 56. | 010010 110110 |
| 7. | 001001 101101 | 57. | 010010 111001 |
| 8. | 001001 101110 | 58. | 010010 111010 |
| 9. | 001001 110011 | 59. | 010010 111100 |
| 10. | 001001 110101 | 60. | 010100 011011 |
| 11. | 001001 110110 | 61. | 010100 011101 |
| 12. | 001001 111010 | 62. | 010100 101011 |
| 13. | 001010 011011 | 63. | 010100 101101 |
| 14. | 001010 011101 | 64. | 010100 101110 |
| 15. | 001010 101011 | 65. | 010100 110011 |
| 16. | 001010 101101 | 66. | 010100 110101 |
| 17. | 001010 101110 | 67. | 010100 110110 |
| 18. | 001010 110011 | 68. | 010100 111001 |
| 19. | 001010 110101 | 69. | 010100 111010 |
| 20. | 001010 110110 | 70. | 010111 000101 |
| 21. | 001010 111001 | 71. | 010111 000110 |
| 22. | 001010 111010 | 72. | 010111 001001 |
| 23. | 001010 111100 | 73. | 010111 001010 |
| 24. | 001100 011011 | 74. | 010111 001100 |
| 25. | 001100 011101 | 75. | 010111 010001 |
| 26. | 001100 101011 | 76. | 010111 010010 |
| 27. | 001100 101101 | 77. | 010111 010100 |
| 28. | 001100 101110 | 78. | 010111 100010 |
| 29. | 001111 000101 | 79. | 010111 100100 |
| 30. | 001111 000110 | 80. | 011000 011011 |
| 31. | 001111 000110 | 81. | 011000 011101 |
| 32. | 001111 001010 | 82. | 011000 101011 |
| 33. | 001111 010001 | 83. | 011000 101101 |
| 34. | 001111 010010 | 84. | 011000 101110 |
| 35. | 001111 010100 | 85. | 011000 110011 |
| 36. | 001111 100100 | 86. | 011000 110101 |
| 37. | 010000 111011 | 87. | 011000 110110 |
| 38. | 010000 111101 | 88. | 011000 111001 |
| 39. | 010001 011011 | 89. | 011000 111010 |
| 40. | 010001 011101 | 90. | 011011 000101 |
| 41. | 010001 011110 | 91. | 011011 000110 |
| 42. | 010001 101011 | 92. | 011011 001001 |
| 43. | 010001 101101 | 93. | 011011 001010 |
| 44. | 010001 101110 | 94. | 011011 001100 |
| 45. | 010001 110011 | 95. | 011011 010001 |
| 46. | 010001 110101 | 96. | 011011 010010 |
| 47. | 010001 110110 | 97. | 011011 010100 |
| 48. | 010001 111010 | 98. | 011011 100010 |
| 49. | 010010 011011 | 99. | 011011 100100 |

FIG. 11B Cont.

| | | |
|---|---|---|
| 109. | 011100 | 100011 |
| 118. | 011101 | 000011 |
| 119. | 011101 | 000101 |
| 120. | 011101 | 000110 |
| 120. | 011101 | 001001 |
| 122. | 011101 | 001010 |
| 123. | 011101 | 001100 |
| 124. | 011101 | 010001 |
| 125. | 011101 | 010010 |
| 126. | 011101 | 010100 |
| 127. | 011101 | 100010 |
| 128. | 011101 | 100100 |
| 129. | 011110 | 000101 |
| 130. | 011110 | 001001 |
| 131. | 011110 | 001010 |
| 132. | 011110 | 001100 |
| 133. | 011110 | 010001 |
| 134. | 011110 | 010010 |
| 135. | 011110 | 010100 |
| 136. | 011110 | 100001 |
| 137. | 011110 | 100010 |
| 138. | 011110 | 100100 |
| 139. | 011111 | 000010 |
| 140. | 100000 | 111101 |
| 141. | 100001 | 011011 |
| 142. | 100001 | 011101 |
| 143. | 100001 | 011110 |
| 144. | 100001 | 101011 |
| 145. | 100001 | 101101 |
| 146. | 100001 | 101110 |
| 147. | 100001 | 110011 |
| 148. | 100001 | 110101 |
| 149. | 100001 | 110110 |
| 150. | 100001 | 111010 |
| 151. | 100010 | 011011 |
| 152. | 100010 | 011101 |
| 153. | 100010 | 101011 |
| 154. | 100010 | 101101 |
| 155. | 100010 | 101110 |
| 156. | 100010 | 110011 |
| 157. | 100010 | 110101 |
| 158. | 100010 | 110110 |
| 159. | 100010 | 111001 |
| 160. | 100010 | 111010 |
| 161. | 100010 | 111100 |
| 170. | 100011 | 011100 |
| 171. | 100011 | 100011 |
| 180. | 100100 | 011011 |
| 181. | 100100 | 011101 |
| 182. | 100100 | 101011 |
| 183. | 100100 | 101101 |
| 184. | 100100 | 101110 |
| 185. | 100100 | 110011 |
| 186. | 100100 | 110101 |
| 187. | 100100 | 110110 |
| 188. | 100100 | 111001 |
| 189. | 100100 | 111010 |
| 190. | 100111 | 000101 |
| 191. | 100111 | 000110 |
| 192. | 100111 | 001001 |
| 193. | 100111 | 001010 |
| 194. | 100111 | 001100 |
| 195. | 100111 | 010001 |
| 196. | 100111 | 010010 |
| 197. | 100111 | 010100 |
| 198. | 100111 | 100010 |
| 199. | 100111 | 100100 |
| 200. | 101000 | 011011 |
| 201. | 101000 | 011101 |
| 202. | 101000 | 101011 |
| 203. | 101000 | 101101 |
| 204. | 101000 | 101110 |
| 205. | 101000 | 110011 |
| 206. | 101000 | 110101 |
| 207. | 101000 | 110110 |
| 208. | 101000 | 111001 |
| 209. | 101000 | 111010 |
| 210. | 101011 | 000101 |
| 211. | 101011 | 000110 |
| 212. | 101011 | 001001 |
| 213. | 101011 | 001010 |
| 214. | 101011 | 001100 |
| 215. | 101011 | 010001 |
| 216. | 101011 | 010010 |
| 217. | 101011 | 010100 |
| 218. | 101011 | 100010 |
| 219. | 101011 | 100100 |
| 220. | 101101 | 000011 |
| 221. | 101101 | 000101 |
| 222. | 101101 | 000110 |
| 223. | 101101 | 001001 |
| 224. | 101101 | 001010 |
| 225. | 101101 | 001100 |
| 226. | 101101 | 010001 |
| 227. | 101101 | 010010 |
| 228. | 101101 | 010100 |
| 229. | 101101 | 100010 |
| 230. | 101101 | 100100 |
| 231. | 101110 | 000101 |
| 232. | 101110 | 001001 |

DATA CODING METHOD FOR USE IN DIGITAL COMMUNICATION SYSTEMS

BACKGROUND OF THE INVENTION

This application is a continuation-in-part of application Ser. No. 318,463, filed Mar. 2, 1989, now abandoned, which is a continuation of application Ser. No. 176,314, filed Mar. 31, 1988, now abandoned.

The present invention relates, in general, to a data coding technique for use with a digital communication system, such as a serial baseband data link.

In the transmission of digital data, coding schemes are often employed to improve the reliability, efficiency, and fault tolerance of the data transmission. In addition, coding schemes can be employed to aid in the synchronization of the data transmission and reception. Examples of such coding techniques are Manchester, Biphase and delay modulation.

Most of these prior coding techniques suffer from one or more drawbacks. For example, in the Manchester code, transitions are added to the data for clocking purposes. The result is that in a worst case data pattern, the encoded data contains twice as many transitions as the number of bits in the original data. This reduces the efficiency of the code to 50 percent, where efficiency is defined as the ratio of the number of bits in the original data word, to the number of transitions in the corresponding encoded data word. This is undesirable since the additional transitions add both cost and time to the transmission of the data.

The Manchester code does, however, provide a constant 50 percent duty cycle, where the duty cycle is defined as the ratio of the number of 1's in a data stream, to the total number of bits in the data stream. Control of the duty cycle is desirable for a number of reasons. For one thing, signal variances that may occur in the transmission medium from cable losses, or transmitter strength, for example, affect the signal strength at the receiver. If the duty cycle is relatively fixed, it is easier to pinpoint and compensate for these losses, and compensation can be achieved with simpler circuitry. Simpler circuitry in turn enables the transmission circuit to run at a higher bit rate, which reduces transmission cost and time.

Many other prior codes, in the interest of improving efficiency, do not provide control over the duty cycle, and, in view of the foregoing, are undesirable. Similarly, many of these codes do not provide sufficient information for reliable clock recovery for worst case data patterns, nor do they provide synchronizing words to enable the receiver circuitry's clock to detect loss of synchronization and to resynchronize with the incoming data stream in the event of an interference or fault induced break in a signal transmission.

Most of the prior coding techniques have thus provided an undesirable trade-off between efficiency, clocking information, and duty cycle control.

In an effort to provide a code which attempts to minimize the above drawbacks, Sperry/UNISYS recently developed a "4B/5B" NRZI code which encodes every four bits of data into a five bit code symbol. In addition, other "out-of-band" five bit code symbols that do not correspond to one of sixteen possible four bit words, are utilized for synchronization, control, or line indication. The resulting code has an efficiency of 80 percent (5 bit code for every 4 bit word), maintains the duty cycle between 40 and 60 percent (2 or 3 1's in every 5 bit code symbol), and includes sufficient clocking information for reliable clock recovery. The 4B/5B code works well, but provides only a single logical channel, and only one pair of out-of-band symbols for self synchronization.

SUMMARY OF THE INVENTION

The present invention is an improved digital data coding method, which provides high efficiency control over the duty cycle and a plurality of dual purpose synchronizing words. In addition, one embodiment of the invention provides plural data channels. Specifically, in a first embodiment of the present invention, a 4B/1/6B is provided which, like the Sperry 4B/5B code, maps every four bits of data into a five bit code symbol (but with a different map). Unlike the Sperry code, however, a second logical channel is provided which is composed of single bits that are placed after each five bit symbol (every sixth bit of the data stream). The data on the second channel can be arbitrarily selected as desired and can include, for example, information from additional communication sources, or control information between the various elements of a communication system.

Also, unlike the Sperry 4B/5B code, the 4B/1/6B code additionally includes a plurality of twelve bit out-of-band synchronizing words that are useful in establishing and maintaining the synchronization of a communication link. Each of these synchronizing words includes a pair of five bit symbols which are selected from the sixteen out-of-band five bit symbols that do not correspond to one of the sixteen possible four bit data words. The selection of the pairs of out-of-band symbols is such that the resulting bit sequences can only occur where they are placed in a data stream even when the symbol boundaries are not known. Thus, they are easily recognizable by computer circuitry, and so can be used for synchronization of a receiver with an incoming data stream. In the first embodiment there are four possible twelve bit synchronizing words that meet the above criteria.

By providing a plurality of self-synchronizing out-of-band synchronizing words, the versatility of the present coding method is substantially increased. Not only can the synchronizing words be utilized for synchronization, they can also be utilized for control information, as well. For example, a first of the synchronizing words can be used to initially synchronize a communication link's symbol boundary and control state; a second can be used to indicate that the link is idle; a third can be used to indicate that the link is waiting for a signal transmission; and, a fourth can be inserted into the data stream periodically to insure that synchronization is maintained.

Like the Sperry 4B/5B code, the efficiency of the 4B/1/6B code is 80 percent for channel one data. Since channel two data is arbitrarily selected, it can be set to an efficiency of 80 percent, which will make the combined efficiency of both channels, also 80 percent. Similarly, the duty cycle of the encoded channel one data, ranges between 40 and 60 percent (2 or 3 1's per 5 bit code symbol), and, by setting the duty cycle of the channel two data to be the same, the duty cycle of the combined channel one and two data stream will also be 40 to 60 percent. The 4B/1/6B code has the further advantage that the maximum consecutive number of either one's or zero's (run length) in the encoded signal is always limited to at most 5. This limit makes it easier for the receiver to synchronize to the signal and to recover clocking information than if no limit was imposed.

The second embodiment of the invention is a 4B/5B code like Sperry's code, and uses the same group of in-band symbols that the 4B/1/6B code uses. However, only a single channel of data is provided. Since it is a 4B/5B code, it too has an efficiency of 80%. The duty cycle varies between 40% and 60% and its maximum run length is 4 since there is no second channel of data. Unlike Sperry's 4B/5B code, this 4B/5B code is a NRZ code (Sperry's is a NRZI code). An NRZ code has the advantage that each bit is independently coded, whereas NRZI code bits are not. Hence, a single bit error can affect only one symbol in an NRZ code, but may affect two symbols in an NRZI code. The present 4B/5B code also has a much larger set of individual synchronizing words and mutually compatible sets of synchronizing words. The synchronizing words are formed from pairs of five bit symbols, and each pair includes at least one out-of-band five bit symbol.

The third embodiment of the invention is a "balanced" 4B/6B code having a fixed 50% duty cycle in which every four bits of data are mapped to a six bit code word. This balanced code is advantageous because it allows inexpensive code translation between links which require a 50% duty cycle, and those requiring a 40 to 60% duty cycle. The balanced 4B/6B code is derived from the two channel embodiment of the invention by choosing the second channel bits to provide a 50% duty cycle. The resulting code is advantageous in that it provides up to 70 synchronizing words. Its efficiency is 66.7%, and its maximum run length is 4 or 5, depending on which of the 70 synchronizing words are used.

BRIEF DESCRIPTION OF THE DRAWINGS

The features and advantages of the present invention will become apparent to those of skill in the art from the following more detailed consideration thereof, taken in conjunction with the accompanying drawings, in which:

FIGS. 3A and 3B are tables illustrating synchronizing words for the first embodiment of the invention that use out-of-band symbol pairs;

FIGS. 4A and 4B are tables illustrating control words for the first embodiment which are formed from other symbol pairs that can be utilized for miscellaneous control purposes;

FIG. 6 is a table of synchronizing words for a second embodiment of the present invention;

FIGS. 7A and 7B are tables of example sets of mutually compatible synchronizing words selected from the table of FIG. 6;

FIG. 8 is a table of in-band code symbols for a third embodiment of the present invention;

FIG. 9 is a table of synchronization words for the third embodiment;

FIG. 10 is a table of an example set of mutually compatible synchronizing words selected from the table of FIG. 9; and, FIGS. 11A and 11B are tables of control words for the second and third embodiments of the invention, respectively.

DETAILED DESCRIPTION OF THE PREFERRED EMBODIMENT

Figures 1, 2:
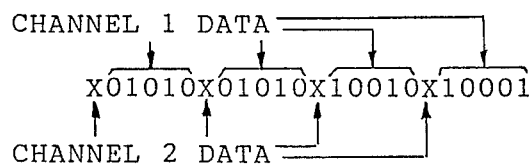
FIG. 1 is a table showing the five bit in-band code symbols which are used to encode each of sixteen possible four bit data words in the first and second embodiments of the invention.
FIG. 2 is an illustration of a sample data stream encoded in accordance with the first embodiment of the present invention.

Turning now to a more detailed consideration of the present invention, there is illustrated in FIG. 1, a table of sixteen five bit in-band code symbols that are utilized to encode each of sixteen possible four bit data words. As shown, there is no particular assignment of these code symbols to the individual data words, and such a selection can be arbitrarily made as desired (the decimal numbers to the left of each entry are for reference purposes only).

The key feature of these sixteen in-band symbols is that each of them includes either 2 or 3 1's, which means each of the code symbols has a duty cycle (ratio of 1's to total number of bits) of either 40 or 60 percent. This is significant because selection of the code symbols in this manner means that the duty cycle of an encoded data stream will be maintained close enough to 50 percent, that any significant variances in the received signal strength can be attributed to other factors such as transmission cable losses, variances in transmitter strength, etc. Being able to pinpoint the cause of signal strength variances enables the communication circuitry to be designed and operated more simply and efficiently, which in turn reduces cost. Also, a data transmission having a duty cycle which remains fairly close to 50 percent can be transmitted at a higher bit rate, which saves time, and again, reduces cost.

FIG. 2 illustrates a sample data stream that is encoded according to a first embodiment of the present invention, which can be termed a 4B/1/6B code. As shown, the data stream includes two channels (one and two) of data that are interleaved with one another in a time division multiplex manner. Channel one data includes five bit encoded symbols from the table in FIG. 1, while channel two includes single bits that are placed in the data stream every six bits, and are marked with an "x" to indicate that any arbitrary choice of a "0" or "1" can be placed at those positions.

As stated above, the duty cycle of the code symbols in FIG. 1, and therefore of the channel one data stream, varies between 40 and 60 percent. The efficiency of the channel one data stream is 80 percent, since every four bit data word is mapped to a five bit code symbol. From this, it is easy to see that the entire data stream can also have a duty cycle of 40 to 60 percent, and an efficiency of 80 percent, if the channel two data is also chosen to meet these criteria. This can easily be accomplished by encoding the channel two data with the same encoding scheme represented in the FIG. 1 table (every four bits of channel two data would be encoded as five bits in accordance with FIG. 1).

The two channel scheme illustrated in FIG. 2 can serve a number of useful purposes. Often times, a communication link requires more than one channel so that more than one source can transmit data over the same link. In other cases, the second channel is useful for transmitting control information between elements of a communication system without interfering with the data transmission. Examples of such control information include data requests, receiver connection or disconnection, flow control, etc.

Turning now to FIG. 3A, there is illustrated a table of ten twelve bit synchronizing words for the 4B/1/6B code. Each of these synchronizing words includes a pair of out-of-band five bit symbols (out-of-band meaning that they are not in the set of in-band symbols in FIG. 1 that are used for data encoding), and a pair of channel two data bits. The channel two bits can be arbitrarily chosen as indicated by the x's placed at the channel two positions in those words. These synchronizing words have the property that their bit patterns will only appear, regardless of symbol boundaries, where they are placed in a data steam if they are used individually. This is not necessarily the case, however, if more than one of the ten synchronizing words are placed in a data stream.

Turning now to FIG. 3B, there is illustrated a subset of four special "mutually compatible" twelve bit synchronizing words that are chosen from the set of FIG. 3A. Each of these synchronizing words, labeled S1, S2, S3, and S4, are termed "mutually compatible" because they are pairs that result in the synchronizing words having the following unique property. If SW represents any one of the four synchronizing words, then if an encoded data stream is constructed from exactly n occurrences of SW along with an arbitrary number and combination of any or all of the other symbols and symbol pairs from the tables illustrated in FIGS. 1, 3B, and either 4A or 4B, along with an arbitrary bit value every six bit positions for channel 2 (with the exception of the fixed channel two bit values for S4), then the bit pattern SW will occur exactly n times in the resulting encoded string regardless of symbol boundaries. S1, S2, S3, and S4 can thus be easily recognized in a data stream and, as will be discussed in further detail below, employed to maintain synchronization of a receiving device with an incoming data stream. Also, the duty cycle of S1 and S2 will remain in the 40 to 60 percent range, regardless of the data on channel two.

The advantage of having a plurality of different synchronizing words is that they can also serve other purposes, as well. If the present invention is employed in a flow controlled full duplex data link for example, S4 can be utilized to initially synchronize the communication link's symbol boundary and control state. Since the channel two data in S4 is fixed, S4 can be used to reset the state on channel two when channel two is used as a control channel.

Of the remaining synchronizing words, one can be used to indicate that the link is idle; a second used to indicate that the link is waiting to receive requested data; and, a third can be placed periodically in the data stream to insure that synchronization can be quickly regained and maintained in case of loss due to noise induced transients, or the like.

FIGS. 4A and 4B illustrate two groups of other symbol pairs which form control words that can be utilized for miscellaneous communications link control. Again, as with FIG. 1, the decimal numbers to the left of each entry in these tables are for reference purposes only. The table in FIG. 4A is structured so that the entries in each subgroup have a common left symbol in channel one. These left symbols were selected from out-of-band symbols so that these entries can be easily recognized in a mixed stream of FIG. 1 data symbols. Similarly, the entries in each group in FIG. 4B have been selected for the same reason so that their right symbols in channel one are selected from out-of-band symbols. It is intended that control words be chosen either from FIG. 4A or from FIG. 4B, but not from both.

Figure 5:
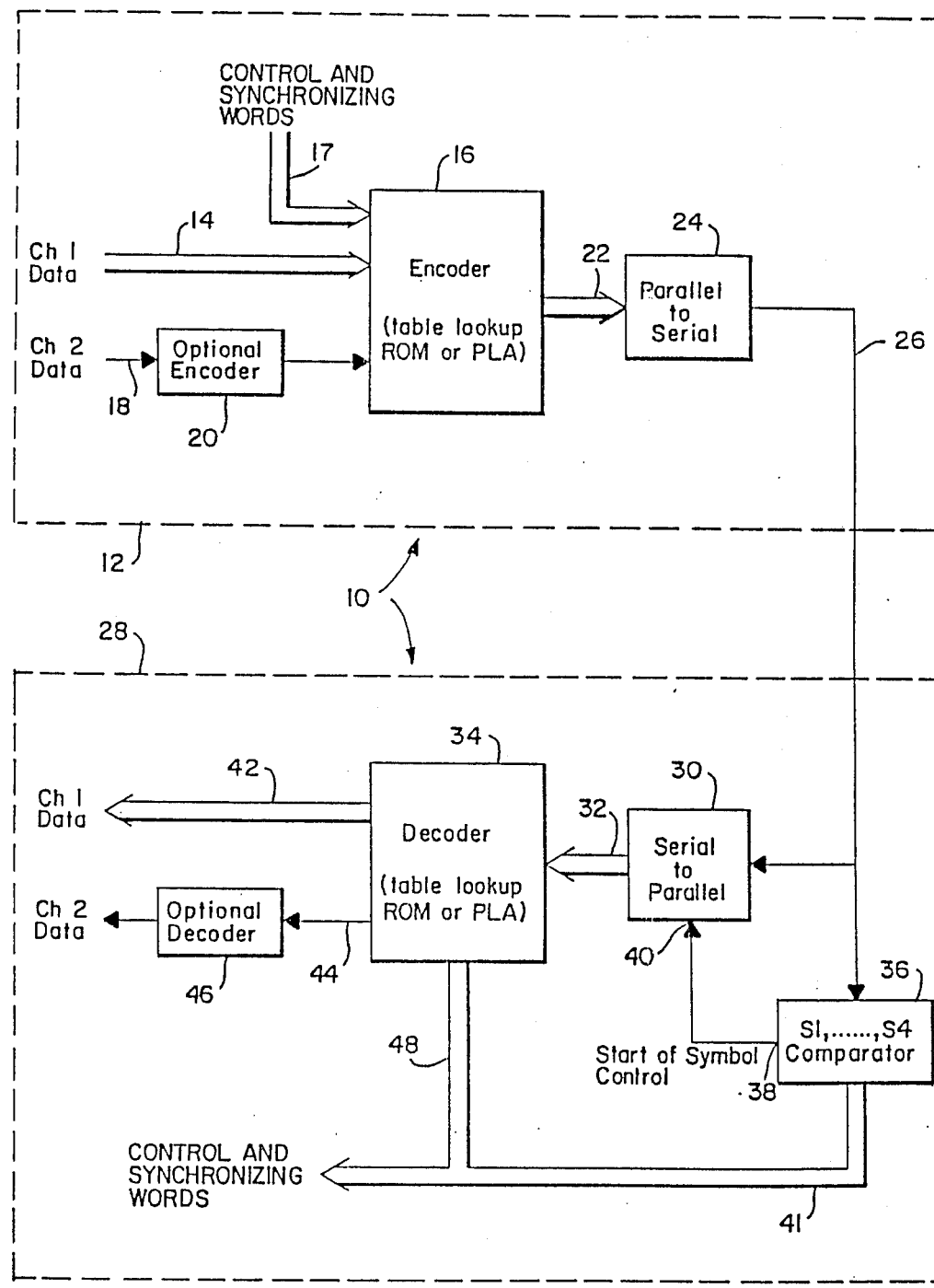
FIG. 5 is a general block diagram of a digital communication system for implementing the disclosed coding methods.

Turning now to FIG. 5, there is illustrated a general block diagram of a communications system and link that employs the present invention. Specifically, there is shown in FIG. 5, a communication system 10, which includes a transmitter and encoder circuit 12. Circuit 12 includes a four line input bus 14 for channel one data, which arrives from a source (not shown) in the form of four bit binary words, and is fed to an encoder 16. Encoder 16 includes a table lookup ROM or PLA (programmable logic array) for encoding each four bits of data into the corresponding five bit code symbol of FIG. 1.

Also fed to encoder 16 is the single bit channel two data which arrives on an input line 18. An optional encoder 20, which can be similar to encoder 16, can be provided if desired to encode the channel two data before it is fed to encoder 16. It should be noted that the channel two data passes through encoder 16 unaltered, and is only fed thereto, to enable it to be combined with the channel one data.

Similarly a third input is provided to encoder 16 in the form of a multiple line bus 17 so that synchronizing words S1, S2, S3, or S4, along with the control words illustrated in FIG. 4A or 4B, can be passed through encoder 16 for controlling and synchronizing the link.

The six bit output from encoder 16 is composed of five bit symbols for channel one data, synchronizing words, and control words in addition to the single bit for channel two. It is fed through a six line bus 22 to a parallel to serial converter 24. The output from converter 24 is a serial data stream like that shown in FIG. 2, and is transmitted via a serial communication link 26 to a receiver and decoder circuit 28.

Receiver and decoder circuit 28 includes a serial to parallel converter 30 which reconverts the incoming data stream into six bit words, and feeds them through a six line bus 32 to a decoder 34. The data stream arriving on link 26 is also fed to a comparator circuit 36, which monitors a 12 bit wide window of the incoming data to sense the synchronizing words, S1, S2, S3, and S4, that are illustrated in FIG. 3B.

A start of symbol control output 38 is fed, in response to detection of one of the synchronizing words, from comparator 36 to a sync input 40 on serial to parallel converter 30. This permits the operation of converter 30 to be properly synchronized with the incoming data stream so that it can determine the boundaries between each arriving code symbol. An output bus 41 is also provided on comparator 36 for outputting any received synchronizing words to an external device (not shown).

Decoder 34, like encoder 16, includes a table lookup ROM or PLA to permit the incoming five bit symbols to be reconverted to the original four bit data words, and fed via a four line output bus 42 to a data receiving element (not shown). Channel two data is fed through decoder 34 to a single output line 44, and through an optional decoder 46 if the channel two data has been previously encoded, to a data receiving element (not shown).

Another output bus 48 is provided on decoder 34 for outputting any of the control words in FIG. 4A or 4B that are received. This output is combined with the second output 41 from comparator 36, and can be fed to an external device (not shown) for control and synchronization purposes.

In a second embodiment of the invention, the second data channel is not employed, and the resulting code is a 4B/5B NRZ code. This code utilizes the in-band code symbols of FIG. 1, and up to thirty individual synchronizing words as illustrated in FIG. 6. These thirty synchronizing words can be used individually with any of the in-band code symbols of FIG. 1 and be recognized in the data stream, although they may not necessarily be used in combination with other synchronizing words of FIG. 6.

Turning now to FIGS. 7A and 7B, two sets of mutually compatible synchronizing words are illustrated, both of which are chosen from FIG. 6 as indicated by the entry numbers. The elements of these sets of synchronizing words can be used in combination with each other and have the same properties as the synchronizing words for the 4B/1/6B code illustrated in FIG. 3B. It should be understood that there are numerous other combinations of mutually compatible synchronizing words, and the sets illustrated in FIGS. 7A and 7B represent only two examples of these combinations.

The in-band code symbols for a third embodiment of the present invention are illustrated in FIG. 8. This code is a 4B/6B code and has a balanced 50% duty cycle. The code symbols are derived from those of FIG. 1 by simply adding a leading 0 or 1 as needed to make the number of 1's and 0's in each symbol equal. The resulting code is a specialization of the 4B/1/6B code where the second channel bit has been set to a specific value for all in-band channel one symbols.

The 4B/6B balanced code has 70 individual twelve bit synchronizing words which are illustrated in FIG. 9. From this set, a large number of mutually compatible sets of synchronizing words having the same properties of the synchronizing words in FIG. 3 for the 4B/1/6B code can be selected. An example of a mutually compatible set of synchronizing words is illustrated in FIG. 10. The number of synchronizing words in the set of FIG. 10 is larger than that of FIG. 3B because the second channel "x" bits now have specific values. Many other mutually compatible subsets of the FIG. 9 set exist including sets which contain more words than the set of FIG. 10.

As an example of a 4B/5B code set for use in a communications data link, the in-band symbols of FIG. 1 can be used with the following set of mutually compatible synchronizing words from FIG. 7B that are chosen to independently code 2 bits of additional control information, w and v, in a highly redundant manner:

| w | v | Entry # from FIG. 7B |
|---|---|---|
| w = 01111 | 01100 = v | 15 |
| w = 01111 | 00010 = vbar | 13 |
| wbar = 10000 | 11101 = v | 18 |
| wbar = 10000 | 10011 = vbar | 16 |

Thus, w=01111, wbar=10000, v=x110x, and vbar=x001x. The w code has Hamming distance 5 which means 3 bit errors within the symbol can be corrected. The v code has Hamming distance 3 which means 1 bit errors within the symbol can be corrected.

In addition, the following out-of-band words can be used for control information without affecting the mutually compatible set properties:

| Word | Information Conveyed |
|---|---|
| 10111 00100 | Start of Packet |
| 01000 11011 | End of Packet |
| 10111 00010 | Idle Channel |
| 01000 11101 | Pad |

The above control words, along with a number of other control words that are compatible with this example set of 4B/5B synchronizing words are illustrated in FIG. 11A.

As an example of a 4B/6B balanced code, the in-band symbols of FIG. 8 can be combined with the following mutually compatible synchronizing words chosen from FIG. 10 to also independently code 2 bits of additional code information, w and v, in a highly redundant manner:

| w | v | Entry # from FIG. 10 |
|---|---|---|
| 001111 | 001100 | 11 |
| 001111 | 100010 | 14 |
| 110000 | 011101 | 57 |
| 110000 | 110011 | 60 |

These synchronizing words differ from those in the 4B/5B example above by the addition of the leading balance bit which provides the 50% duty cycle. As with the 4B/5B example above, the following other out-of-band words can be used for control information without affecting the mutually compatible set properties:

| Word | Information Conveyed |
|---|---|
| 010111 100100 | Start of packet |
| 110111 000100 | |
| 001000 111011 | End of packet |
| 101000 011011 | |
| 010111 100010 | Idle Channel |
| 110111 000010 | |
| 001000 111101 | Pad |
| 101000 011101 | |

Figure 11B:
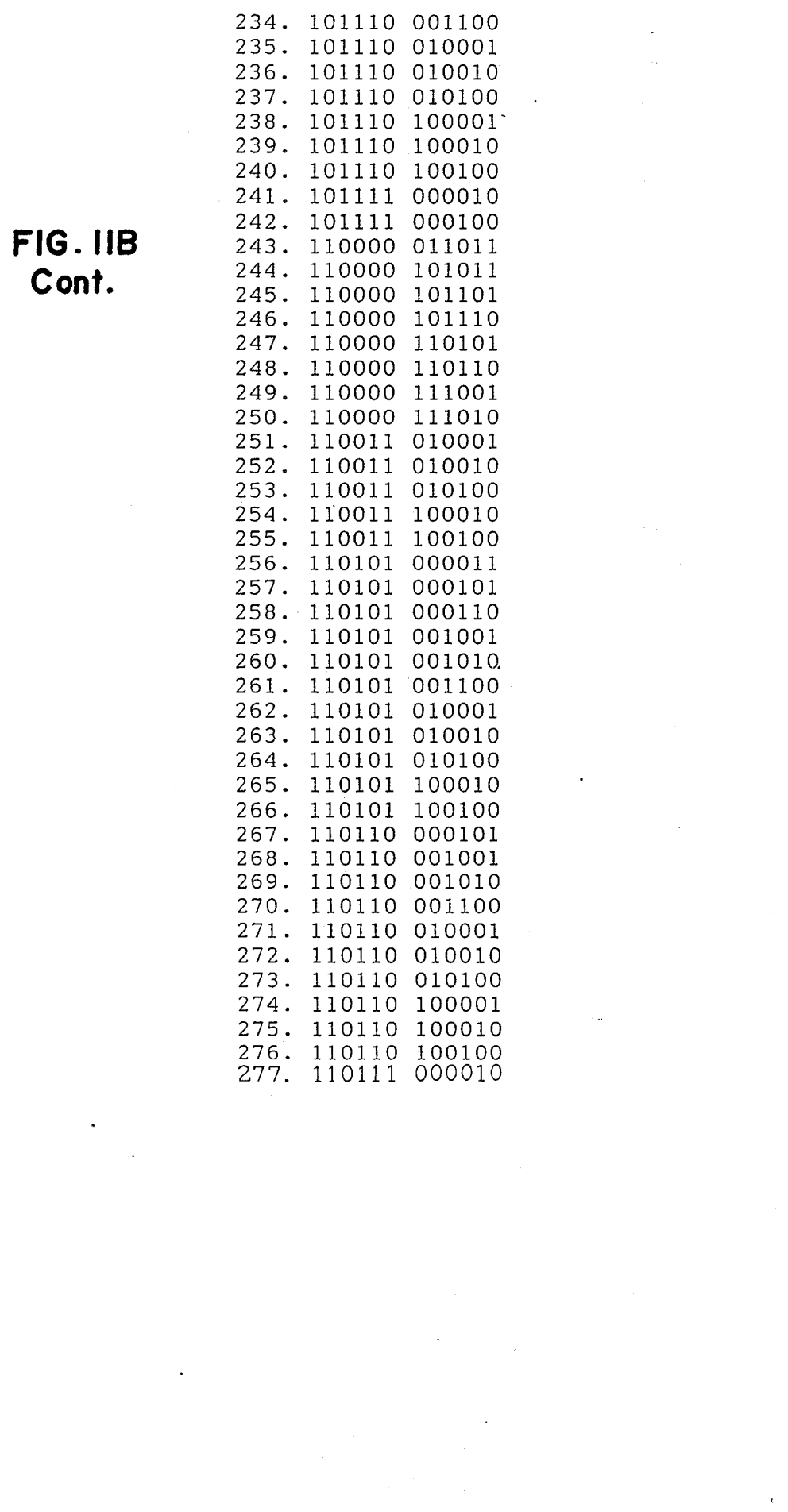

As illustrated, two different words are specified for each function. They differ from one another only by the leading balance bit in each of the two six bit symbols that make up the words. Either of the two words can be used for the specified functions. These control words, along with other control words that are compatible with the 4B/6B synchronizing words of this example are illustrated in FIG. 11B.

As thus can be seen from the foregoing, the present invention provides an improved data encoding method which possesses a high efficiency, has good duty cycle control, and is very versatile by virtue of the two channel scheme in the first embodiment, and multiple synchronizing words in all three embodiments that can be employed both for data synchronization and control information transmission.

Although the invention has been illustrated in terms of preferred embodiments, it will be understood that numerous variations and modifications can made by those of skill in the art without departing from the true spirit and scope thereof as set forth in the following claims.

We claim:

1. A method of coding a stream of binary data in a digital communication system comprising the steps of:

selecting a first group of sixteen five bit binary symbols;

mapping each of the five bit binary symbols in said first group to one of each of sixteen possible four bit binary words;

encoding a first binary data stream by converting every four bits of data in the data stream to a corresponding five bit symbol from said first group;

interleaving single bits of data from a second data stream between each five bit symbol from said first group that corresponds to each four bits of data in said first data stream to form an encoded data stream;

selecting a second group of five bit binary symbols that are not in said first group;

forming a plurality of synchronizing words from pairs of the five bit symbols in said second group and two additional bits of binary data, by placing one of the additional bits immediately before one of the two five bit symbols in each synchronizing word, and the second additional bit immediately after the same one of the two five bit symbols in each synchronizing word, said synchronizing words having the characteristic that if they are placed in said encoded data stream exactly n times, their bit patterns will occur in said encoded data stream exactly n times regardless of symbol boundaries; and, placing at least one of said synchronizing words in said encoded data stream.

2. The method of claim 1 wherein, each of the five bit code symbols in said first group is selected to have a duty cycle of 40 to 60 percent, and each of said plurality of synchronizing words is selected to have a duty cycle of 40 to 60 percent, where the duty cycle is defined as the ratio of the number of one's in a string of binary bits to the total number of bits in the string.

3. The method of claim 2, wherein said second data stream is encoded to also have a duty cycle of 40 to 60 percent so that the resulting encoded data stream also has a duty cycle of 40 to 60 percent.

4. The method of claim 3, wherein said second data stream is encoded by mapping every four bits of data in the stream to the corresponding five bit symbol in said first group.

5. The method of claim 1, further including the step of assigning an information conveying function to each of said plurality of synchronizing words so that the synchronizing words can be employed both for synchronization of a data stream with a communications element, and transfer of information between communication elements.

6. The method of claim 5, wherein the step of forming a plurality of synchronizing words comprises forming four synchronizing words.

7. The method of claim 6, wherein the synchronizing words are formed to be X01111X00001; X01111X00010; X01111X00011; and, 010000111101, where the x's denote arbitrarily chosen bits of data from said second data stream.

8. The method of claim 2 wherein the sixteen five bit code symbols in said first group are selected to be 00101; 00110; 01001; 01010; 01011; 01100; 01101; 01110; 10001; 10010; 10011; 10100; 10101; 10110; 11001; and 11010.

9. The method of claim 1, further including the steps of:

forming a plurality of control words from other pairs of the five bit symbols in said second group and two additional bits of binary data, by placing one of the additional bits immediately before one of the two five bit symbols in each control word, and the second additional bit immediately after the same one of the two five bit symbols in each control word; and, placing at least one of said control words in said encoded data stream.

10. A method of coding binary data in a digital communication system comprising the steps of:

selecting a first group of sixteen five bit binary symbols, each having a duty cycle of between 40 and 60 percent, where the duty cycle is defined as the ratio of the number of 1's in a symbol to the total number of bits in a symbol;

mapping each of said five bit binary symbols to one of each of sixteen possible four bit binary words;

encoding a first binary data stream by converting every four bits of data in the data stream into a corresponding five bit symbol from said first group;

forming an encoded data stream by interleaving single arbitrary bits of binary data from a second data stream between each of the five bit symbols that are generated by encoding the first binary data stream;

selecting a second group of five bit binary symbols that are not in said first group;

forming a plurality of twelve bit synchronizing words from pairs of the five bit symbols in said second group and two arbitrary bits of binary data from said second data stream by placing one bit of data from said second stream immediately before one of the two five bit symbols in each synchronizing word, and a second bit of data from said second stream immediately after the same one of the two five bit symbols in each synchronizing words, said synchronizing words having the characteristic that if they are placed in said encoded data stream exactly n times, their bit patterns will occur in said encoded data stream exactly n times regardless of symbol boundaries;

assigning information conveying functions to each of said synchronizing words; and, placing at least one of said synchronizing words in said encoded data stream.

11. A method of coding a stream of binary data in a digital communication system comprising the steps of:

selecting a first group of sixteen five bit binary symbols;

mapping each of the five bit binary symbols in said first group to one of each of sixteen possible four bit binary words;

encoding a binary data stream by converting every four bits of data in the data stream to a corresponding five bit symbol from said first group;

forming a plurality of synchronizing words from pairs of five bit binary symbols, at most one five bit symbol of each pair being from said first group; said synchronizing words having the characteristic that if they are placed in said encoded data stream exactly n times, their bit patterns will occur in said encoded data stream exactly n times regardless of symbol boundaries; and, placing at least one of said synchronizing words in said encoded data stream.

12. The method of claim 11 wherein, each of the five bit code symbols in said first group is selected to have a duty cycle of 40 to 60 percent, and each of said plurality of synchronizing words is selected to have a duty cycle of 40 to 60 percent, where the duty cycle is defined as the ratio of the number of one's in a string of binary bits to the total number of bits in the string.

13. The method of claim 11, further including the step of assigning an information conveying function to each of said plurality of synchronizing words so that the synchronizing words can be employed both for synchronization of a data stream with a communications element, and transfer of information between communication elements.

14. The method of claim 12 wherein the sixteen five bit code symbols in said first group are selected to be 00101; 00110; 01001; 01010; 01011; 01100; 01101; 01110; 10001; 10010; 10011; 10100; 10101; 10110; 11001; and 11010.

15. The method of claim 12, wherein said synchronizing words are chosen from the group in the table illustrated in FIG. 6.

16. The method of claim 11, further including the steps of:
forming a plurality of control words from other pairs of five bit symbols and,
placing at least one of said control words in said encoded data stream.

17. A method of coding a stream of binary data in a digital communication system comprising the steps of:
selecting a first group of sixteen six bit binary symbols each having a duty cycle of 50%;
mapping each of the six bit binary symbols in said first group to one of each of sixteen possible four bit binary words;
encoding a binary data stream by converting every four bits of data in the data stream to a corresponding six bit symbol from said first group;
forming a plurality of synchronizing words having a 50% duty cycle from pairs of six bit binary symbols, at most one six bit symbol of each pair being from said first group;
said synchronizing words having the characteristic that if they are placed in said encoded data stream exactly n times, their bit patterns will occur in said encoded data stream exactly n times regardless of symbol boundaries; and,
placing at least one of said synchronizing words in said encoded data stream.

18. The method of claim 17, further including the step of assigning an information conveying function to each of said plurality of synchronizing words so that the synchronizing words can be employed both for synchronization of a data stream with a communications element, and transfer of information between communication elements.

19. The method of claim 17, wherein the sixteen six bit code symbols in said first group are selected to be 100101; 100110; 101001; 101010; 001011; 101100; 001101; 001110; 110001; 110010; 010011; 110100; 010101; 010110; 011001; and 011010.

20. The method of claim 17, wherein said synchronizing words are chosen from the group in the table illustrated in FIG. 9.

* * * * *